(12) United States Patent
Tabata et al.

(10) Patent No.: US 8,593,695 B2
(45) Date of Patent: Nov. 26, 2013

(54) IMAGE PROCESSING APPARATUS AND NON-TRANSITORY COMPUTER READABLE RECORDING MEDIUM

(75) Inventors: Shinji Tabata, Kanagawa (JP); Toshifumi Takahira, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 333 days.

(21) Appl. No.: 13/039,943

(22) Filed: Mar. 3, 2011

(65) Prior Publication Data
US 2012/0019871 A1 Jan. 26, 2012

(30) Foreign Application Priority Data
Jul. 26, 2010 (JP) ................................. 2010-167327

(51) Int. Cl.
*G06T 5/00* (2006.01)
*G06K 9/00* (2006.01)
*G06K 9/46* (2006.01)

(52) U.S. Cl.
USPC ........................ 358/3.27; 382/181; 382/190

(58) Field of Classification Search
USPC ......... 358/3.27; 382/216, 181, 190, 201, 209, 382/218
See application file for complete search history.

(56) References Cited

U.S. PATENT DOCUMENTS

| | | | | |
|---|---|---|---|---|
| 5,153,444 A * | 10/1992 | Maeda et al. | ............ | 250/559.05 |
| 6,005,977 A * | 12/1999 | Tanimizu et al. | ............ | 382/216 |
| 7,706,623 B2 * | 4/2010 | Oaki | ............... | 382/254 |
| 8,180,159 B2 * | 5/2012 | Hayasaki | ............ | 382/216 |
| 2005/0200905 A1* | 9/2005 | Kimura | ............ | 358/3.27 |

FOREIGN PATENT DOCUMENTS

| | | |
|---|---|---|
| JP | 05-260298 A | 10/1993 |
| JP | 08-324023 A | 12/1996 |
| JP | 2002-016797 A | 1/2002 |
| JP | 2003-230009 A | 8/2003 |

\* cited by examiner

*Primary Examiner* — Charlotte M Baker
(74) *Attorney, Agent, or Firm* — Sughrue Mion, PLLC

(57) ABSTRACT

An image processing apparatus including: a first storage portion that stores patterns used for matching with edge portions of a linear image included in an input image, the patterns having respective different sizes, and each of the patterns being composed of pixels and including a target pixel corresponding to a pixel to be deleted in the linear image; a selection portion that selects a pattern having a size according to a line width of a line thinning process to the linear image, from the stored patterns; a pattern detection portion that matches the selected pattern with the linear image while shifting the selected pattern, and detects whether the selected pattern is matched with the linear image; and a deletion portion that, when the matching result is detected, deletes the pixel in the linear image corresponding to the target pixel in the selected pattern.

6 Claims, 15 Drawing Sheets

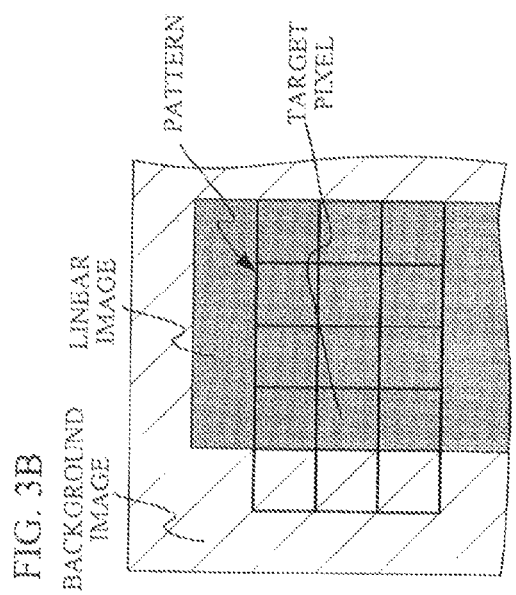
FIG. 3B
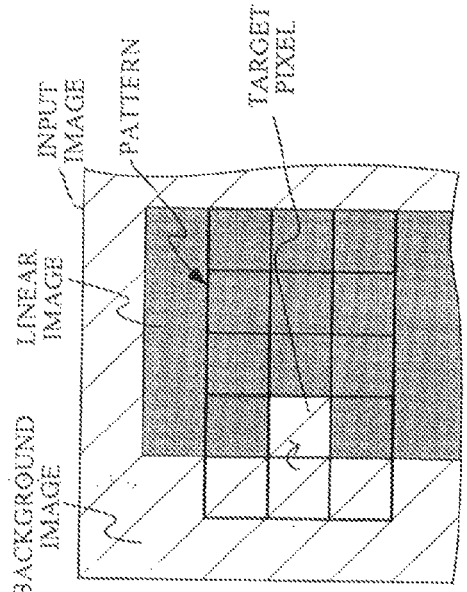
FIG. 3D
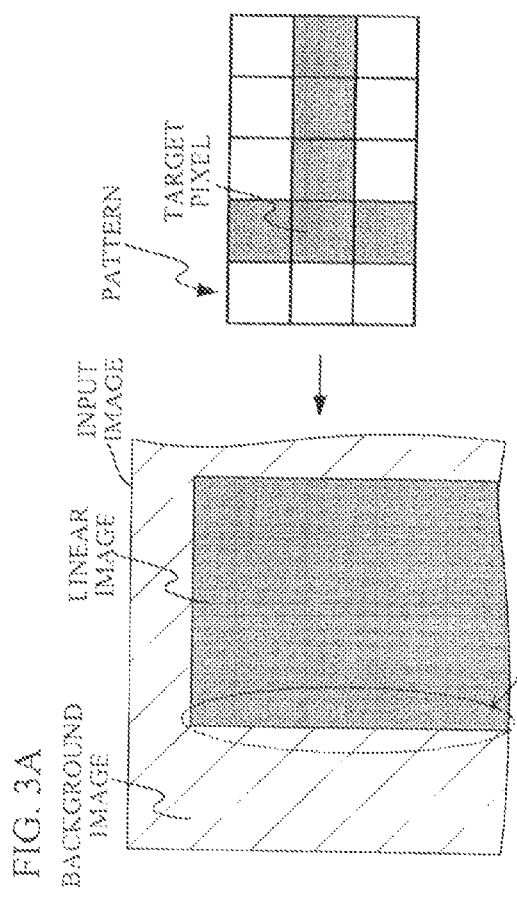
FIG. 3A
FIG. 3C
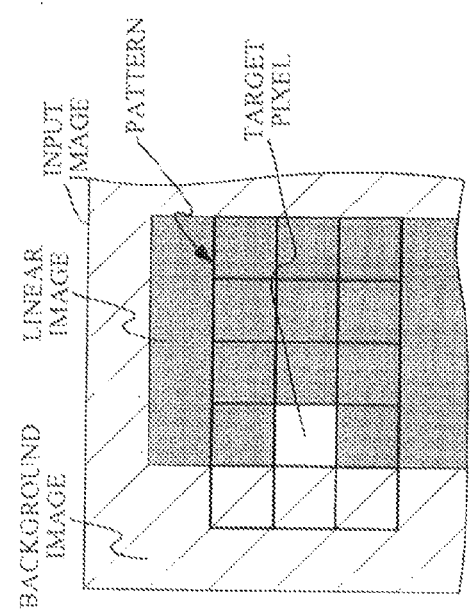

FIG. 4A
FIG. 4B
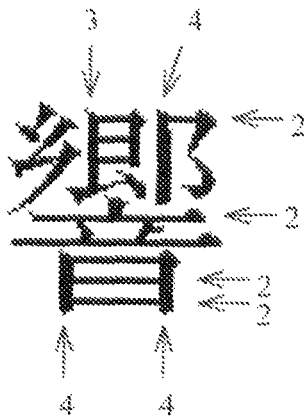
FONT TYPE: MING TYPE
SIZE: 4pt
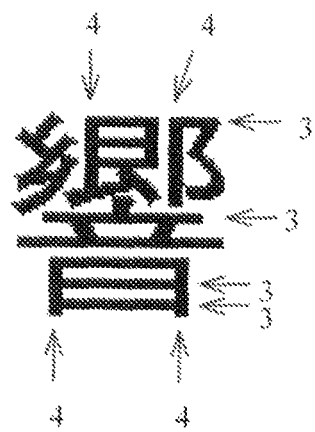
FONT TYPE: GOTHIC TYPE
SIZE: 4pt

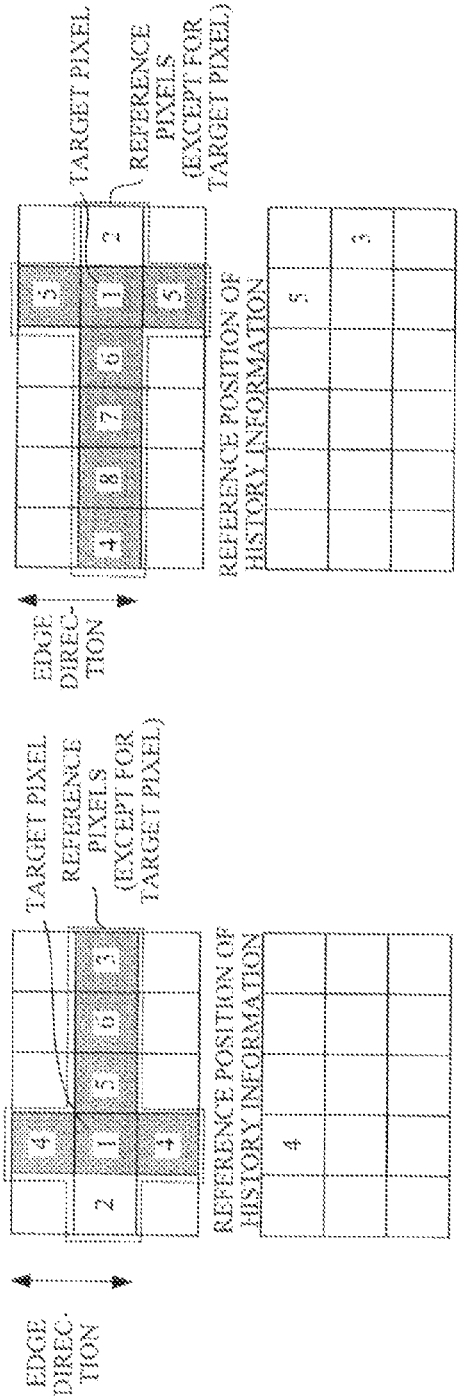
FIG. 5A LEFT EDGE PATTERN
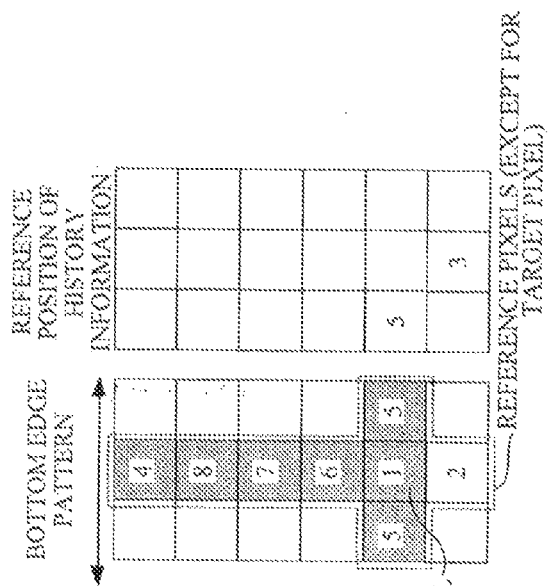
FIG. 5B RIGHT EDGE PATTERN
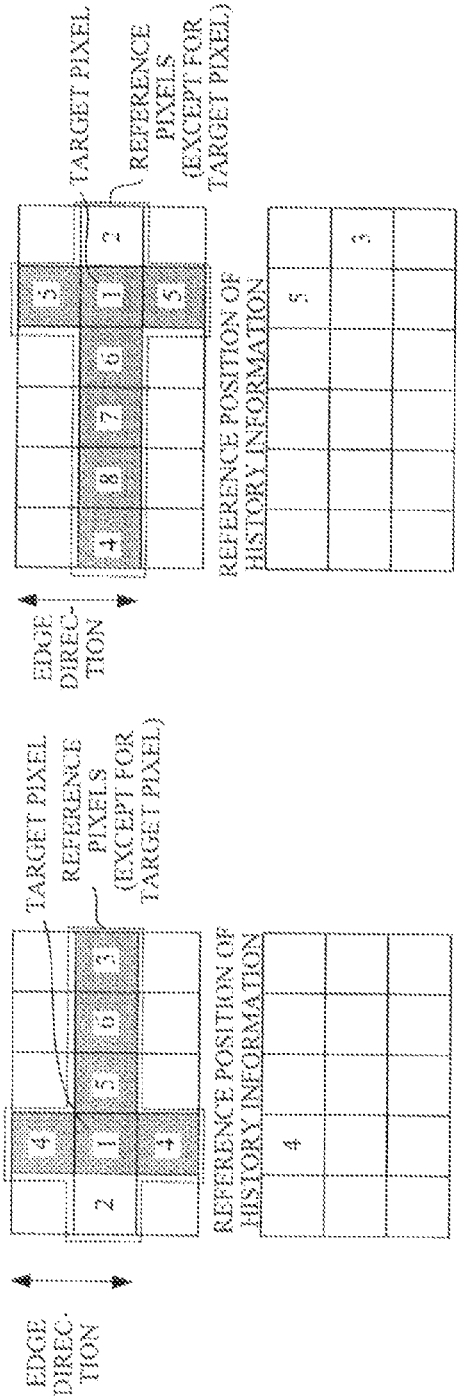
FIG. 5C TOP EDGE PATTERN
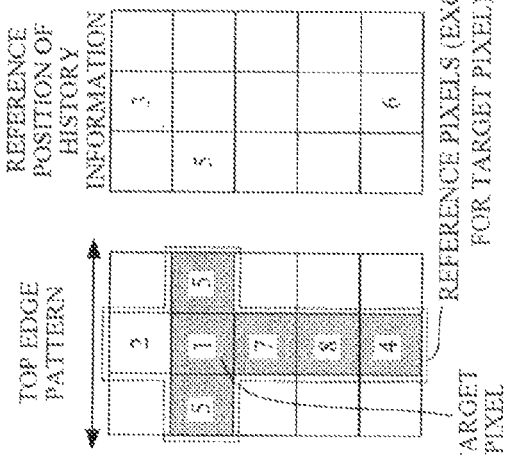
FIG. 5D BOTTOM EDGE PATTERN

FIG. 13

| SETTING OF LINE THINNING PROCESS | LINE WIDTH | | | | | | | | | | | EDGE PATTERN | |
|---|---|---|---|---|---|---|---|---|---|---|---|---|---|
| | 0.06pt | 0.12pt | 0.18pt | 0.24pt | 0.30pt | 0.36pt | 0.42pt | 0.48pt | 0.54pt | 0.60pt | | LEFT (TOP) | RIGHT (BOTTOM) |
| | 1dot | 2dot | 3dot | 4dot | 5dot | 6dot | 7dot | 8dot | 9dot | 10dot | | | |
| NO ACTION | 1(dot) | 2 | 3 | 4 | 5 | 6 | 7 | 9 | 9 | 10 | | | |
| STRONG | 1(dot) | 2 | 2 | 3 | 3 | 4 | 5 | 6 | 7 | 8 | | 3×4 (4×3) | 3×5 (5×3) |
| MIDDLE | 1(dot) | 2 | 3 | 3 | 4 | 4 | 5 | 6 | 7 | 8 | | 3×5 (5×3) | 3×6 (6×3) |
| WEAK | 1(dot) | 2 | 3 | 4 | 4 | 5 | 5 | 6 | 7 | 8 | | 3×6 (6×3) | 3×7 (7×3) |

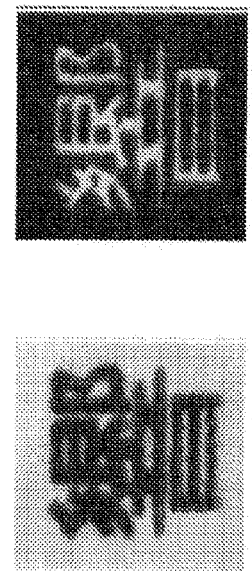
FIG. 15A BEFORE PATTERN MATCHING PROCESS
MING TYPE OF 4 POINTS
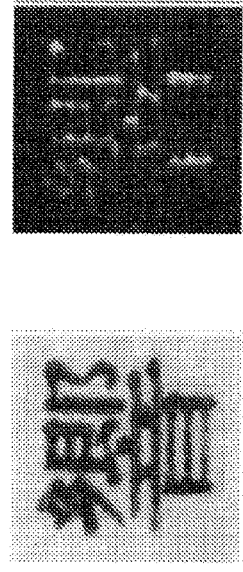
FIG. 15B AFTER PATTERN MATCHING PROCESS
MING TYPE OF 4 POINTS
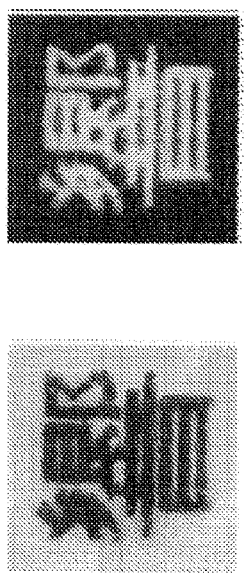
FIG. 15C BEFORE PATTERN MATCHING PROCESS
GOTHIC TYPE OF 4 POINTS
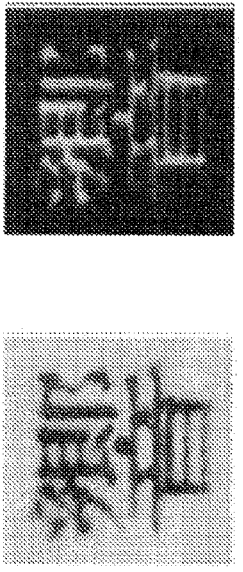
FIG. 15D AFTER PATTERN MATCHING PROCESS
GOTHIC TYPE OF 4 POINTS

IMAGE PROCESSING APPARATUS AND NON-TRANSITORY COMPUTER READABLE RECORDING MEDIUM

CROSS-REFERENCE TO RELATED APPLICATION

This application is based on and claims priority under 35 USC 119 from Japanese Patent Application No. 2010-167327 filed on Jul. 26, 2010.

BACKGROUND (i) Technical Field

The present invention relates to an image processing apparatus, and a non-transitory computer readable recording medium.

(ii) Related Art

A linear image such as a character and a circle, which is formed by an image forming apparatus such as a printer and a multi-function peripheral, tends to thicken more than an ideal linear image in a positive state, and the linear image to be formed by the image forming apparatus tends to slightly collapse more than an ideal linear image in a negative state.

SUMMARY

According to an aspect of the present invention, there is provided An image processing apparatus including: a first storage portion that stores a plurality of patterns used for matching with edge portions of a linear image included in an input image, the patterns having respective different sizes, and each of the patterns being composed of a plurality of pixels and including a target pixel corresponding to a pixel to be deleted in the linear image; a selection portion that selects a pattern having a size according to a line width of a line thinning process to the linear image, from the patterns stored into the first storage portion; a pattern detection portion that matches the selected pattern with the linear image while shifting the selected pattern, and detects whether the selected pattern is matched with the linear image; and a deletion portion that, when it is detected that the selected pattern is matched with the linear image, deletes the pixel in the linear image corresponding to the target pixel in the selected pattern.

BRIEF DESCRIPTION OF THE DRAWINGS

Exemplary embodiments of the present invention will be described in detail based on the following figures, wherein:

FIG. 3A is a diagram illustrating an example of a part of an input image and a pattern when the input image is in a positive state;

FIG. 3B is a diagram schematically illustrating a pattern matching process;

FIG. 3C is a diagram illustrating a state where a target pixel is deleted;

FIG. 3D is a diagram illustrating a state where a target pixel is replaced with an adjacent pixel;

FIGS. 4A and 4B are diagrams illustrating line widths constituting an image (i.e., a linear image) of a rasterized Chinese character;

FIG. 5A is a diagram illustrating a left edge pattern and a reference position of history information;

FIG. 5B is a diagram illustrating a right edge pattern and a reference position of history information;

FIG. 5C is a diagram illustrating a top edge pattern and a reference position of history information;

FIG. 5D is a diagram illustrating a bottom edge pattern and a reference position of history information;

FIG. 13 is a diagram illustrating a relationship between options in column of a line thinning process and widths of the linear image;

FIG. 15A is a diagram illustrating an example of the Chinese characters which are formed by a Ming type of 4 points in the positive and the negative states before the pattern matching process;

FIG. 15B is a diagram illustrating an example of the Chinese characters which are formed by the Ming type of 4 points in the positive and the negative states after the pattern matching process;

FIG. 15C is a diagram illustrating an example of the Chinese characters which are formed by a Gothic type of 4 points in the positive and the negative states before the pattern matching process; and FIG. 15D is a diagram illustrating an example of the Chinese characters which are formed by the Gothic type of 4 points in the positive and the negative states after the pattern matching process.

DETAILED DESCRIPTION

A description will now be given of an exemplary embodiment with reference to the accompanying drawings.

Figure 1:
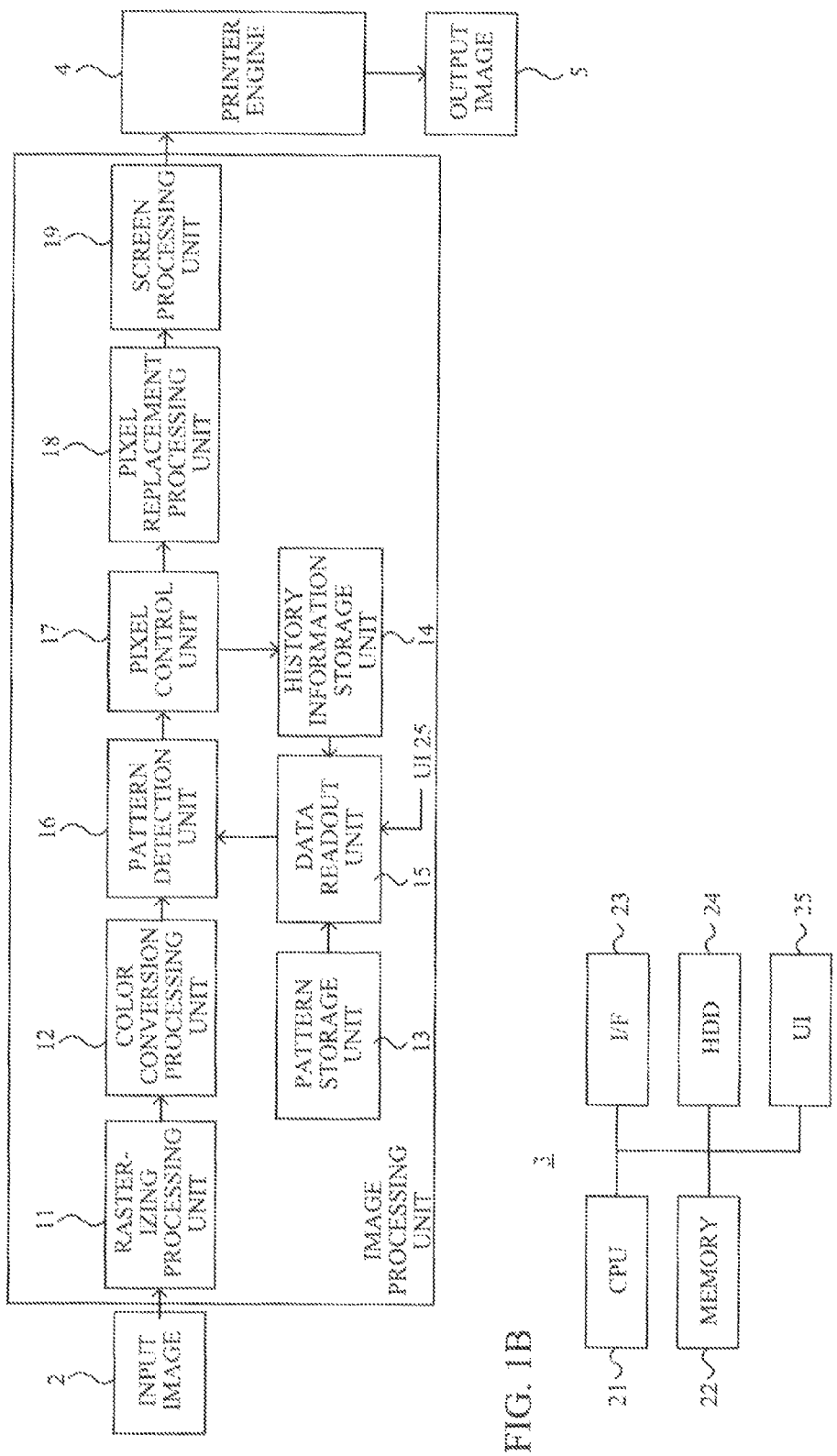
FIG. 1A is a block diagram illustrating a schematic configuration of an image processing apparatus according to an exemplary embodiment.
FIG. 1B is a block diagram illustrating a hardware configuration of an image processing unit.
Figure 2:
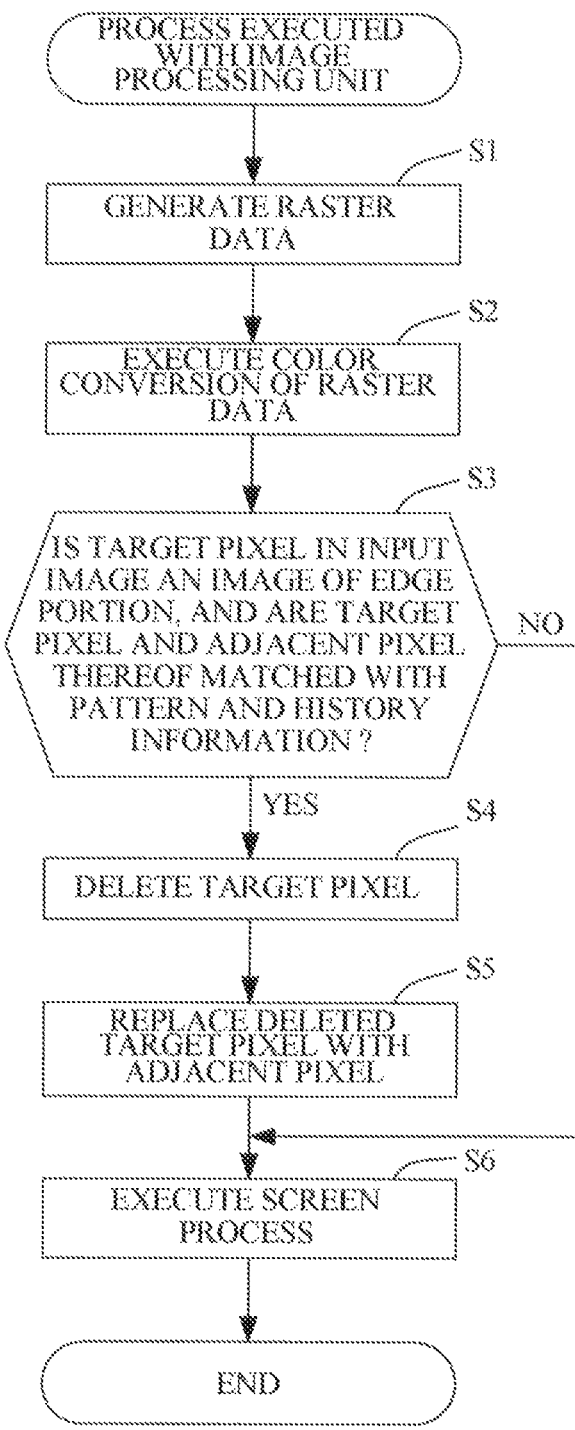
FIG. 2 is a flowchart illustrating a process executed with the image processing unit.

FIG. 1A is a block diagram illustrating a schematic configuration of an image processing apparatus according to an exemplary embodiment. FIG. 1B is a block diagram illustrating a hardware configuration of an image processing unit. FIG. 2 is a flowchart illustrating a process executed with the image processing unit.

An image processing apparatus of FIG. 1A is a printer, a copy machine or a multi-function peripheral. An image processing unit 3 executes a given image process to an input image 2, and outputs the input image 2 to which the given image process is executed, as an output image 5 via a printer engine 4.

The image processing unit 3 includes a rasterizing processing unit 11, a color conversion processing unit 12, a pattern storage unit 13 (a first storage portion), a history information storage unit 14 (a second storage portion), a data readout unit 15, a pattern detection unit 16 (a pattern detection portion), a pixel control unit 17 (a deletion portion), a pixel replacement processing unit 18 (a replacement portion), and a screen processing unit 19. As illustrated in FIG. 1B, the image processing unit 3 includes a CPU (Central Processing Unit) 21, a memory 22, an interface (I/F) 23, a hard disk drive (HDD) 24, and a user interface (UI) 25 (a setting portion). The rasterizing processing unit 11, the color conversion processing unit 12, the data readout unit 15, the pattern detection unit 16, the pixel control unit 17, the pixel replacement processing unit 18, and the screen processing unit 19 are achieved by the CPU 21. The pattern storage unit 13 and the history information storage unit 14 are achieved by the memory 22 or the HDD 24.

The rasterizing processing unit 11 generates raster data from the input image 2 (step S1 in FIG. 2). The color conversion processing unit 12 executes the color conversion of the raster data (step S2).

The pattern storage unit 13 stores patterns for detecting that a target pixel to be deleted is an image of an edge portion in the input image, and the target pixel and adjacent pixel thereof are identical with a specific pattern. The history information storage unit 14 stores a result of the pattern matching process which the pattern detection unit 16 has executed (i.e., information indicating whether each pixel was deleted in the past) as history information. The data readout unit 15 reads out a pattern compared with the input image from the pattern storage unit 13, reads out the history information from the history information storage unit 14, and outputs the readout pattern and the readout history information to the pattern detection unit 16. The data readout unit 15 reads out a set of patterns in accordance with selection information from the UI 25, from a plurality of sets of patterns stored into the pattern storage unit 13, and outputs the readout set of patterns to the pattern detection unit 16, as described later.

The pattern detection unit 16 detects whether the target pixel in the input image (i.e., the pixel to be deleted) is the image of the edge portion, and the target pixel and the adjacent pixel thereof are matched with the pattern and the history information received from the data readout unit 15 (step S3).

When the result of the pattern matching process by the pattern detection unit 16 is "YES", the pixel control unit 17 deletes the target pixel, i.e., eliminates the target pixel from a print object (step S4). When the result of the pattern matching process by the pattern detection unit 16 is "NO", the pixel control unit 17 proceeds to a procedure of step S6, described later. Also, the pixel control unit 17 outputs the result of the past pattern matching process (i.e., position information on the pixel(s) deleted by the past pattern matching process) to the history information storage unit 14 as the history information. The pixel replacement processing unit 18 replaces the target pixel with the adjacent pixel (step S5). In this case, when the input image is in the positive state, the adjacent pixel is a pixel of a background image adjacent to the target pixel. When the input image is a reversed image of the negative state, the adjacent pixel is a pixel that is adjacent to the target pixel and composes an image having meaning. Here, the reversed image is a reversed character, a reversed figure, or the like. A portion of the reversed image having meaning is composed of a non-print pixel, and a portion of the reversed image having no meaning is composed of a print pixel.

The screen processing unit 19 executes a screen process generating the tones of colors for the image output from the pixel replacement processing unit 18, and outputs the result of the screen process to the printer engine 4 (step S6).

FIG. 3A is a diagram illustrating an example of a part of the input image and the pattern when the input image is in the positive state. FIG. 3B is a diagram schematically illustrating the pattern matching process. FIG. 3C is a diagram illustrating a state where the target pixel is deleted. FIG. 3D is a diagram illustrating a state where the target pixel is replaced with the adjacent pixel.

When the input image is composed of the background image and the linear image such as a character and a circle as illustrated in FIG. 3A, the pattern detection unit 16 matches the pattern illustrated in FIG. 3A with the input image in view of the history information. When the pattern illustrated in FIG. 3A is matched with the input image as illustrated in FIG. 3B, the pixel control unit 17 deletes the target pixel as illustrated in FIG. 3C. The target pixel is deleted as illustrated in FIG. 3C, so that a blank part is caused between the background image and the linear image. Consequently, the pixel replacement processing unit 18 buries the pixel of the adjoining background image to the blank part as illustrated in FIG. 3D. As a result, the pixel replacement processing unit 18 replaces the target pixel with the pixel of the adjoining background image. Thereby, the width of the linear image such as the character and the circle is improved.

Although in the examples of FIGS. 3A to 3C, an left edge of the linear image is replaced with the pixel of the background image, the replacement is not limited to this. A right edge, a top edge, or a bottom edge of the linear image may be replaced with the pixel of the background image according to the type of the pattern. In this case, the pixel replacement processing unit 18 replaces the target pixel with a pixel corresponding to the background image in the left, right, top and bottom pixels adjacent to the target pixel. For example, when the left edge pattern, described later, is used, the pixel replacement processing unit 18 replaces the target pixel with a left pixel corresponding to the background image. Similarly, when a right edge pattern, a top edge pattern, or a bottom edge pattern, described later, is used, the pixel replacement processing unit 18 replaces the target pixel with a right pixel, a top pixel, or a bottom pixel corresponding to the background image, respectively.

FIGS. 4A and 4B are diagrams illustrating line widths constituting an image (i.e., an linear image) of a rasterized Chinese character. FIG. 4A indicates a Chinese character which is formed by a Ming type of 4 points, and FIG. 4B indicates a Chinese character which is formed by a Gothic type of 4 points. Numerals of FIGS. 4A and 4B indicate a number of dots. When the resolution of the rasterization is 1200 dpi (dot/inch), the Chinese characters of the Ming type and the Gothic type of 4 points are formed by lines having the width of 2 to 4 dots (0.12 to 0.24 points).

FIG. 5A is a diagram illustrating the left edge pattern and a reference position of the history information. FIG. 5B is a diagram illustrating the right edge pattern and a reference position of the history information. FIG. 5C is a diagram illustrating the top edge pattern and a reference position of the history information. FIG. 5D is a diagram illustrating the bottom edge pattern and a reference position of the history information. The pixels of the hatching of FIGS. 5A to 5D are pixels to be matched with the linear image when the input image is in the positive state.

Each of the edge patterns of FIGS. 5A to 5D has a rectangular shape. The left edge pattern, the right edge pattern, the top edge pattern, and the bottom edge pattern are stored into the pattern storage unit 13, and are used for deleting at lease one edge of the left side, the right side, the top side, and the bottom side of the linear image, respectively. Also, the history information and information indicative of the reference position of the history information are stored into the history information storage unit 14.

The pattern detection unit 16 sequentially scans the input image with the left edge pattern of 3 (row)×5 (column), and executes the pattern matching process with reference to the reference position of the history information in FIG. 5A. Then, the pattern detection unit 16 sequentially scans the input image with the top edge pattern of 5 (row)×3 (column), and executes the pattern matching process with reference to the reference position of the history information in FIG. 5C. Further, the pattern detection unit 16 sequentially scans the input image with the right edge pattern of 3 (row)×6 (column), and executes the pattern matching process with reference to the reference position of the history information in FIG. 5B. Finally, The pattern detection unit 16 sequentially scans the input image with the bottom edge pattern of 6 (row)×3 (column), and executes the pattern matching process with reference to the reference position of the history information in FIG. 5D.

The reason why the pattern detection unit 16 refers to the history information is to evade a thin spot and change of shape of the linear image which is caused by the double deletion of pixels of the linear image.

In FIGS. 5A to 5D, each of numerical characters included in each of the edge patterns indicates a condition number of the pixel to be checked when the pattern detection unit 16 executes the pattern matching process. Each of numerical characters included in the reference position of the history information indicates the condition number of the pixel to be checked, and indicates that the pattern detection unit 16 refers to the history information of the pixel corresponding to the numerical character. In each of the edge patterns, pixels to which the condition numbers are given, except for the target pixel, are reference pixels. The reference pixels are pixels referred to by the pattern detection unit 16 when the target pixel is deleted. A parallel direction to an edge row to be deleted is an edge direction. For example, in the left edge pattern, when the input image is in the positive state, the parallel direction to a left edge row of the linear image is the edge direction. In the top edge pattern, when the input image is in the positive state, the parallel direction to a top edge row of the linear image is the edge direction.

In FIG. 5A, the pattern detection unit 16 judges whether to meet six following conditions.
(1) The target pixel is "ON" ("ON" indicates that the linear image exists, and "OFF" indicates that the linear image does not exist);
(2) A left pixel of the target pixel is "OFF";
(3) A pixel away from the target pixel in a right direction by only 3 pixels is "ON";
(4) At least one of upper and lower pixels of the target pixel is "ON", and the upper pixel of the target pixel was deleted in the past;
(5) A right pixel of the target pixel is "ON"; and
(6) A pixel away from the target pixel in the right direction by only 2 pixels is "ON".

When the above-mentioned six conditions are met, the pixel control unit 17 deletes the target pixel.

In FIG. 5B, the pattern detection unit 16 judges whether to meet eight following conditions.
(1) The target pixel is "ON";
(2) A right pixel of the target pixel is "OFF";
(3) The right pixel of the target pixel was not deleted in the past;
(4) A pixel away from the target pixel in a left direction by only 4 pixels is "ON";
(5) At least one of upper and lower pixels of the target pixel is "ON", and the upper pixel of the target pixel was deleted in the past;
(6) A left pixel of the target pixel is "ON";
(7) A pixel away from the target pixel in the left direction by only 2 pixels is "ON"; and
(8) A pixel away from the target pixel in the left direction by only 3 pixels is "ON".

When the above-mentioned eight conditions are met, the pixel control unit 17 deletes the target pixel.

In FIG. 5C, the pattern detection unit 16 judges whether to meet eight following conditions.
(1) The target pixel is "ON";
(2) An upper pixel of the target pixel is "OFF";
(3) The upper pixel of the target pixel was not deleted in the past;
(4) A pixel away from the target pixel in a down direction by only 3 pixels is "ON";
(5) At least one of left and right pixels of the target pixel is "ON", and the left pixel of the target pixel was deleted in the past;
(6) A pixel away from the target pixel in the down direction by only 3 pixels was not deleted in the past;
(7) A lower pixel of the target pixel is "ON"; and
(8) A pixel away from the target pixel in the down direction by only 2 pixels is "ON".

When the above-mentioned eight conditions are met, the pixel control unit 17 deletes the target pixel.

In FIG. 5D, the pattern detection unit 16 judges whether to meet eight following conditions.
(1) The target pixel is "ON";
(2) A lower pixel of the target pixel is "OFF";
(3) The lower pixel of the target pixel was not deleted in the past;
(4) A pixel away from the target pixel in an up direction by only 4 pixels is "ON";
(5) At least one of left and right pixels of the target pixel is "ON", and the left pixel of the target pixel was deleted in the past;
(6) An upper pixel of the target pixel is "ON";
(7) A pixel away from the target pixel in the up direction by only 2 pixels is "ON"; and
(8) A pixel away from the target pixel in the up direction by only 3 pixels is "ON".

When the above-mentioned eight conditions are met, the pixel control unit 17 deletes the target pixel.

Each of the edge patterns of FIGS. 5A to 5D sets the target pixel to an intersection point, and includes a crisscross pattern composed of the target pixel, plural reference pixels extending from the target pixel in the edge direction in parallel to the edge row of the input image to be deleted, and plural reference pixels extending from the target pixel in a direction perpendicular to the edge direction. The plural reference pixels extending from the target pixel in the direction perpendicular to the edge direction are more than the plural reference pixels extending from the target pixel in the edge direction.

The shape of the left edge pattern of FIG. 5A is not identical with the shape of the right edge pattern of FIG. 5B, i.e., is asymmetry, compared to the shape of the right edge pattern of FIG. 5B. That is, the shape of the crisscross pattern of FIG. 5A is asymmetry, compared to the shape of the crisscross pattern of FIG. 5B. Similarly, the shape of the top edge pattern of FIG. 5C is not identical with the shape of the bottom edge pattern of FIG. 5D, i.e., is asymmetry, compared to the shape of the bottom edge pattern of FIG. 5D. That is, the shape of the crisscross pattern of FIG. 5C is asymmetry, compared to the shape of the crisscross pattern of FIG. 5D. The top edge pattern of FIG. 5C is identical with an edge pattern in which the left edge pattern of FIG. 5A is rotated clockwise by 90 degrees. The bottom edge pattern of FIG. 5D is identical with an edge pattern in which the right edge pattern of FIG. 5B is rotated clockwise by 90 degrees.

Thus, the left and the right edge patterns or the top and the bottom edge patterns (especially, the shape of the crisscross pattern) are asymmetry, and hence it is evaded that the width of the linear image is deleted more than necessary.

For example, when the width of the linear image is 3 pixels or less, the linear image does not match with the left edge pattern of FIG. 5A and the right edge pattern of FIG. 5B. In this case, the width of the linear image is not deleted.

When the width of the linear image is 4 or 5 pixels, one pixel in a width direction of the linear image is deleted with the left edge pattern of FIG. 5A. In this case, the width of the linear image is 3 or 4 pixels, so that the linear image does not match with the right edge pattern of FIG. 5B, and the width of the linear image is not deleted. It is therefore evaded that the width of the linear image is deleted more than necessary.

When the width of the linear image is 6 pixels or more, one pixel in a width direction of the linear image is deleted with the left edge pattern of FIG. 5A. In this case, since the width of the linear image is 5 pixels or more, one pixel in the width direction of the linear image is further deleted with the right edge pattern of FIG. 5B. Therefore, when the width of the linear image is 6 pixels or more, two pixels in the width direction of the linear image are deleted.

Thus, since the left and the right edge patterns or the top and the bottom edge patterns (especially, the shape of the crisscross pattern) are asymmetry, a deletion amount of pixels is changed according to the width of the linear image.

Especially, the number of reference pixels (i.e., reference pixels of the hatching) that extend in the direction perpendicular to the edge direction from the target pixel, are included in the crisscross pattern of the left edge pattern, and should be matched with the linear image is different from the number of corresponding reference pixels included in the crisscross pattern of the right edge pattern. It is therefore evaded that the width of the linear image is deleted more than necessary. Further, the deletion amount of pixels is changed according to the width of the linear image. Similarly, the number of reference pixels (i.e., reference pixels of the hatching) that extend in the direction perpendicular to the edge direction from the target pixel, are included in the crisscross pattern of the top edge pattern, and should be matched with the linear image is different from the number of corresponding reference pixels included in the crisscross pattern of the bottom edge pattern. It should be noted that the number of different reference pixels may be one or more.

More specifically, the reference pixels (i.e., reference pixels of the hatching) that extend in the direction perpendicular to the edge direction from the target pixel, are included in the crisscross pattern of the left edge pattern, and should be matched with the linear image have less at least one pixel than the corresponding reference pixels included in the crisscross pattern of the right edge pattern. Similarly, the reference pixels (i.e., reference pixels of the hatching) that extend in the direction perpendicular to the edge direction from the target pixel, are included in the crisscross pattern of the top edge pattern, and should be matched with the linear image have less at least one pixel than the corresponding reference pixels included in the crisscross pattern of the bottom edge pattern.

When the input image is the reversed image of the negative state, the pixels of the hatching portion of FIGS. 5A to 5D indicate a portion having no meaning (i.e., pixels with toner or print pixels). The pixels other than the hatching portion of FIGS. 5A to 5D indicate a portion having meaning (i.e., pixels with no toner or non-print pixels).

When the input image is the reversed image of the negative state, and the pattern matching process is executed with each of the edge patterns of FIGS. 5A to 5D, the target pixel is replaced with the non-print pixel. Therefore, the thinness of the reversed image is improved. For example, when the width of the linear image in the edge direction is composed of one pixel (i.e., the non-print pixel as the width of the linear image is composed of one pixel), the width of the linear image in the edge direction increases 2 pixels by the left edge pattern and the right edge pattern, thereby totaling 3 pixels. When the width of the linear image in the edge direction is also composed of plural pixels, the width of the linear image in the edge direction increases 2 pixels. Similarly, when the width of the linear image in the direction perpendicular to the edge direction is composed of one pixel, the width of the linear image in the direction perpendicular to the edge direction increases 2 pixels by the top edge pattern and the bottom edge pattern.

Figure 6:
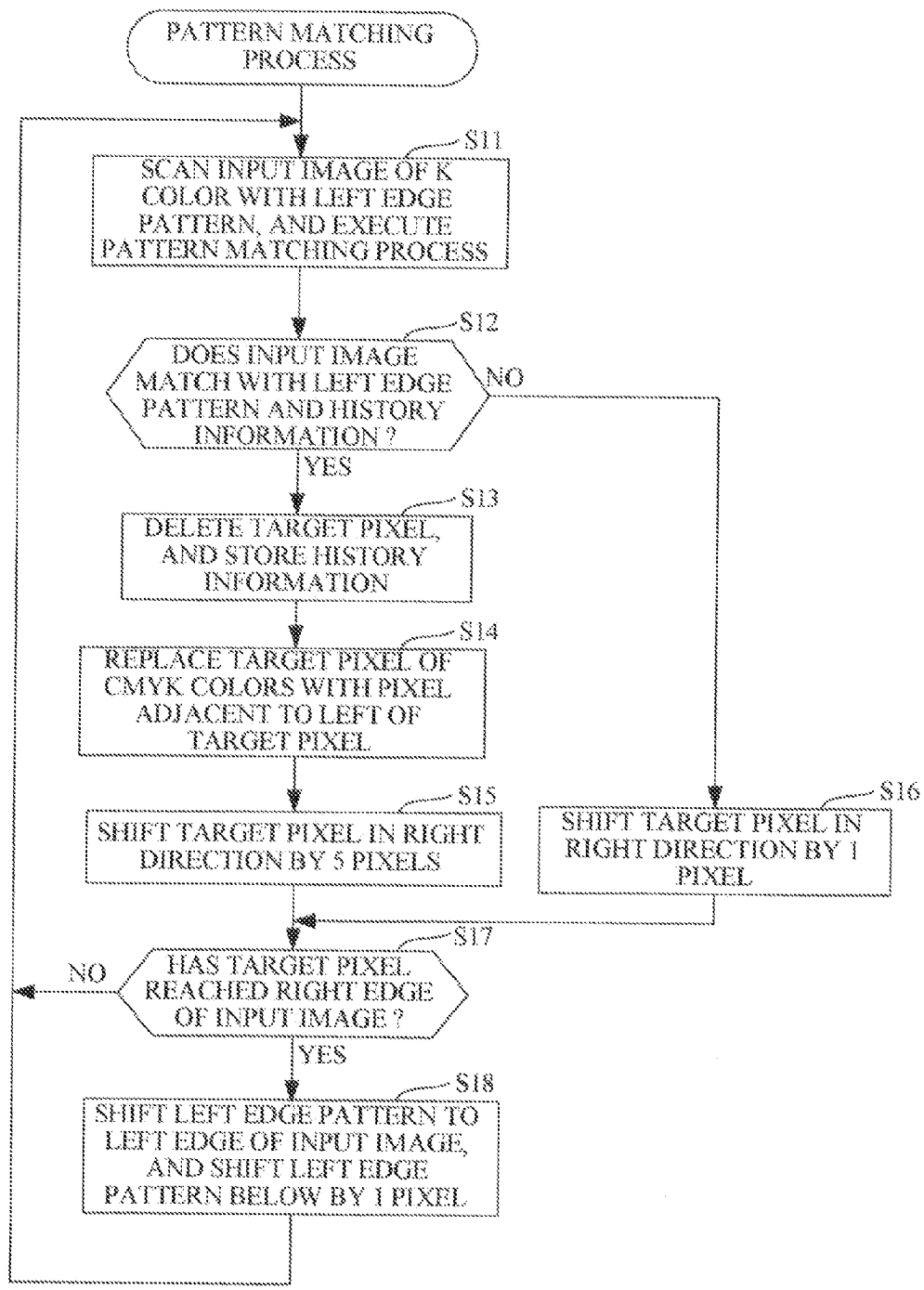
FIG. 6 is a flowchart illustrating the pattern matching process for which the left edge pattern is used.

FIG. 6 is a flowchart illustrating the pattern matching process for which the left edge pattern is used.

First, the pattern detection unit 16 scans the input image of K color (black) in the input image of CMYK (cyan, magenta, yellow, and black) colors with the left edge pattern, and executes the pattern matching process with reference to the history information (step S11). At this time, the pattern detection unit 16 scans all pixels (i.e., pixels from an upper-left corner to a lower-right corner) of the input image of the K color with the left edge pattern while shifting the target pixel one by one. When the pattern detection unit 16 judges that the input image of the K color matches with the left edge pattern and the history information (YES in step S12), the pixel control unit 17 sets a pixel value of the target pixel of the K color to "0" (i.e., deletes the target pixel), and stores the history information indicating that the target pixel of the K color has been deleted into the history information storage unit 14 (step S13). The pixel replacement processing unit 18 replaces the target pixel of the CMYK colors with a pixel adjacent to the left of the target pixel (step S14). Then, the pattern detection unit 16 shifts the target pixel in the right direction by 5 pixels (step S15). When the pattern detection unit 16 judges that the input image of the K color does not match to the left edge pattern (NO in step S12), the pattern detection unit 16 shifts the target pixel in the right direction by one pixel (step S16).

Moreover, the pattern detection unit 16 judges that the target pixel has reached a right edge of the input image (step S17). If the answer to the step S17 is "YES", the pattern detection unit 16 shifts the left edge pattern to a left edge of the input image, and shifts the left edge pattern below by one pixel (step S18). The procedure returns to step S11. If the answer to the step S17 is "NO", the procedure returns to step S11.

Figure 7:
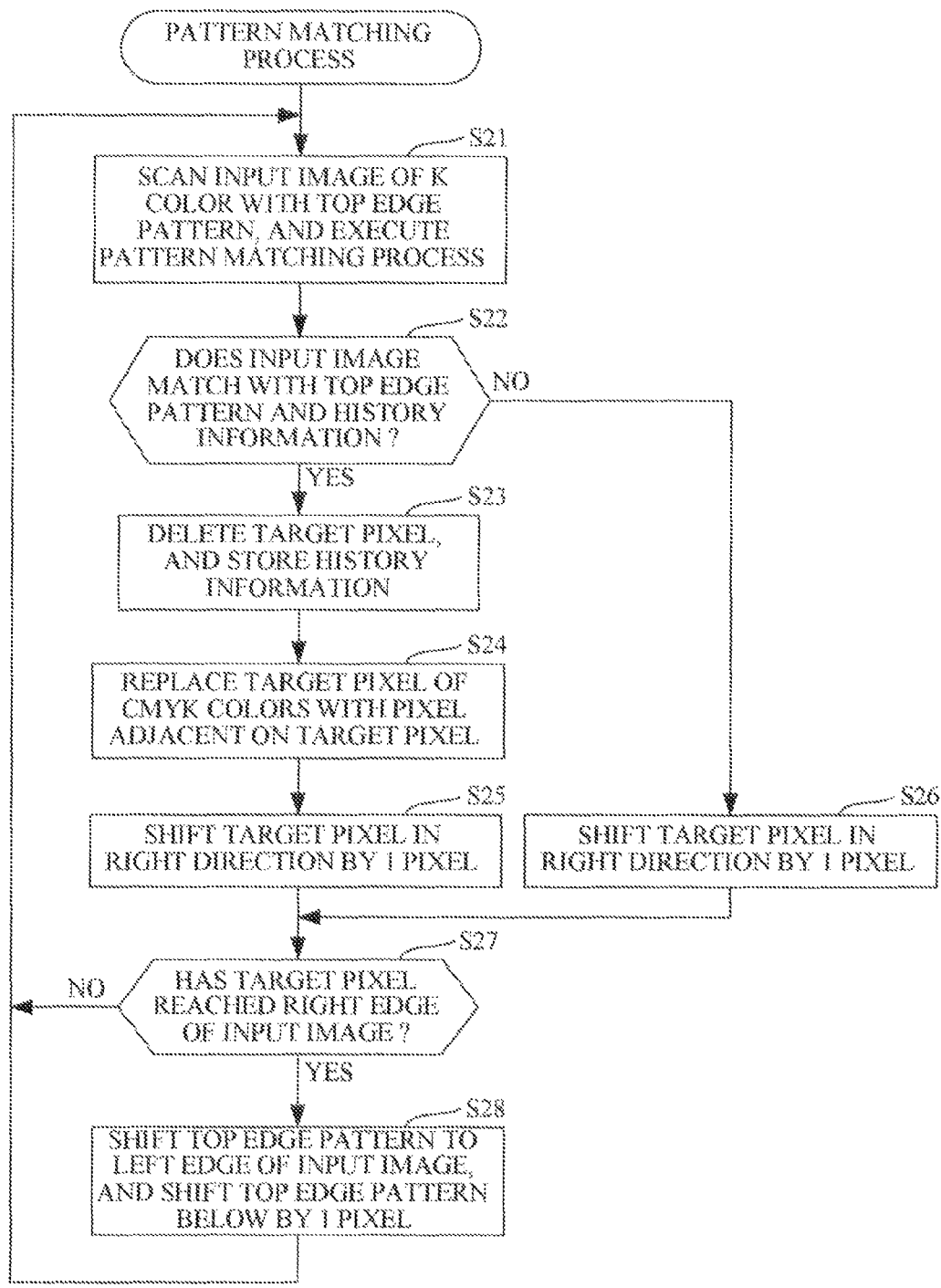
FIG. 7 is a flowchart illustrating the pattern matching process for which the top edge pattern is used.

FIG. 7 is a flowchart illustrating the pattern matching process for which the top edge pattern is used.

First, the pattern detection unit 16 scans the input image of K color (black) in the input image of CMYK (cyan, magenta, yellow, and black) colors with the top edge pattern, and executes the pattern matching process with reference to the history information (step S21). At this time, the pattern detection unit 16 scans all pixels (i.e., pixels from the upper-left corner to the lower-right corner) of the input image of the K color with the top edge pattern while shifting the target pixel one by one. When the pattern detection unit 16 judges that the input image of the K color matches with the top edge pattern and the history information (YES in step S22), the pixel control unit 17 sets the pixel value of the target pixel of the K color to "0" (i.e., deletes the target pixel), and stores the history information indicating that the target pixel of the K color has been deleted into the history information storage unit 14 (step S23). The pixel replacement processing unit 18 replaces the target pixel of the CMYK colors with a pixel adjacent on the target pixel (step S24). Then, the pattern detection unit 16 shifts the target pixel in the right direction by one pixel (step S25). When the pattern detection unit 16 judges that the input image of the K color does not match to the top edge pattern (NO in step S22), the pattern detection unit 16 shifts the target pixel in the right direction by one pixel (step S26).

Moreover, the pattern detection unit 16 judges that the target pixel has reached the right edge of the input image (step S27). If the answer to the step S27 is "YES", the pattern detection unit 16 shifts the top edge pattern to the left edge of the input image, and shifts the top edge pattern below by one pixel (step S28). The procedure returns to step S21. If the answer to the step S27 is "NO", the procedure returns to step S21.

Figure 8:
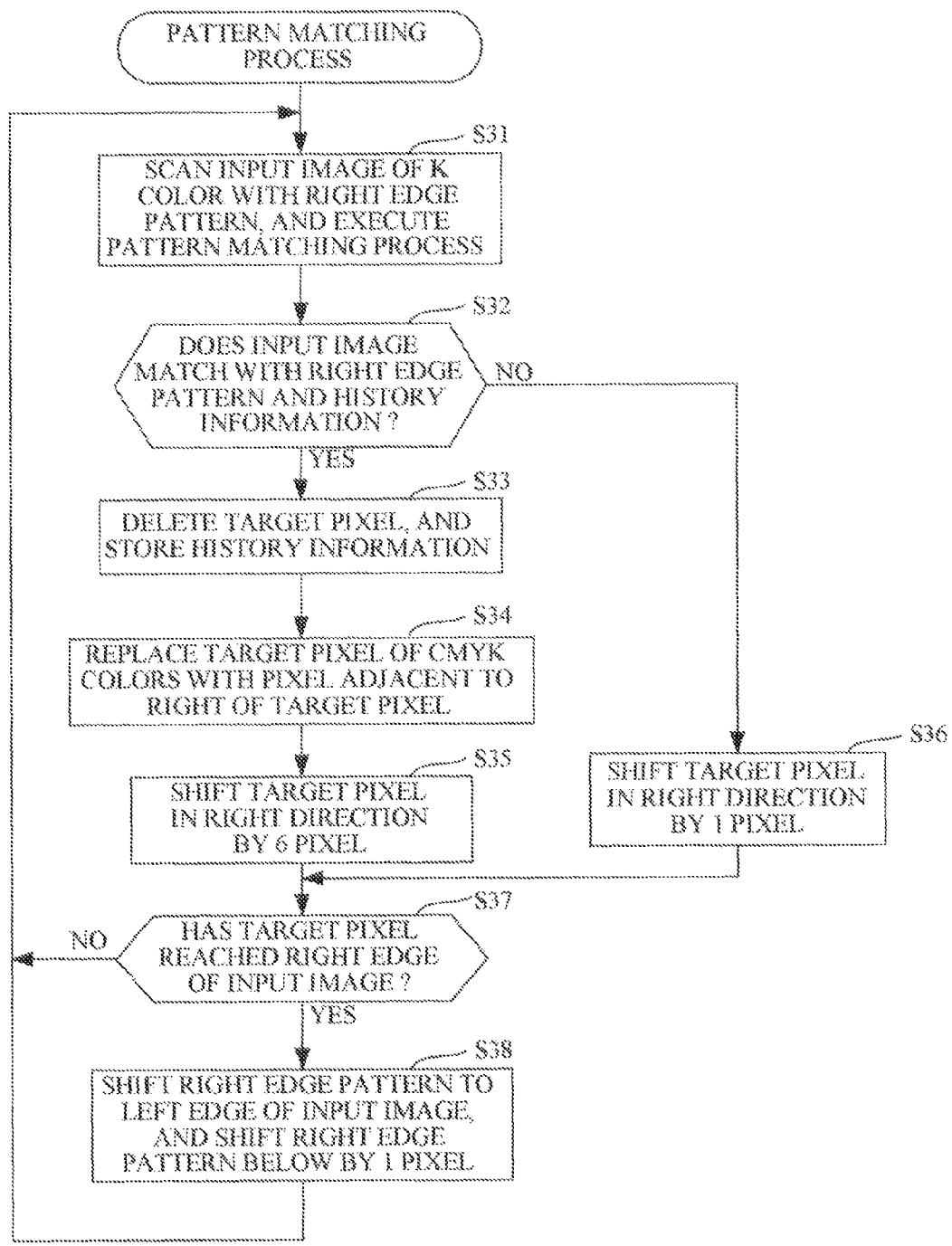
FIG. 8 is a flowchart illustrating the pattern matching process for which the right edge pattern is used.

FIG. 8 is a flowchart illustrating the pattern matching process for which the right edge pattern is used.

First, the pattern detection unit 16 scans the input image of K color (black) in the input image of CMYK (cyan, magenta, yellow, and black) colors with the right edge pattern, and executes the pattern matching process with reference to the history information (step S31). At this time, the pattern detection unit 16 scans all pixels (i.e., pixels from the upper-left corner to the lower-right corner) of the input image of the K color with the right edge pattern while shifting the target pixel one by one. When the pattern detection unit 16 judges that the input image of the K color matches with the right edge pattern and the history information (YES in step S32), the pixel control unit 17 sets the pixel value of the target pixel of the K color to "0" (i.e., deletes the target pixel), and stores the history information indicating that the target pixel of the K color has been deleted into the history information storage unit 14 (step S33). The pixel replacement processing unit 18 replaces the target pixel of the CMYK colors with a pixel adjacent to the right of the target pixel (step S34). Then, the pattern detection unit 16 shifts the target pixel in the right direction by 6 pixels (step S35). When the pattern detection unit 16 judges that the input image of the K color does not match to the right edge pattern (NO in step S32), the pattern detection unit 16 shifts the target pixel in the right direction by one pixel (step S36).

Moreover, the pattern detection unit 16 judges that the target pixel has reached the right edge of the input image (step S37). If the answer to the step S37 is "YES", the pattern detection unit 16 shifts the right edge pattern to the left edge of the input image, and shifts the right edge pattern below by one pixel (step S38). The procedure returns to step S31. If the answer to the step S37 is "NO", the procedure returns to step S31.

Figure 9:
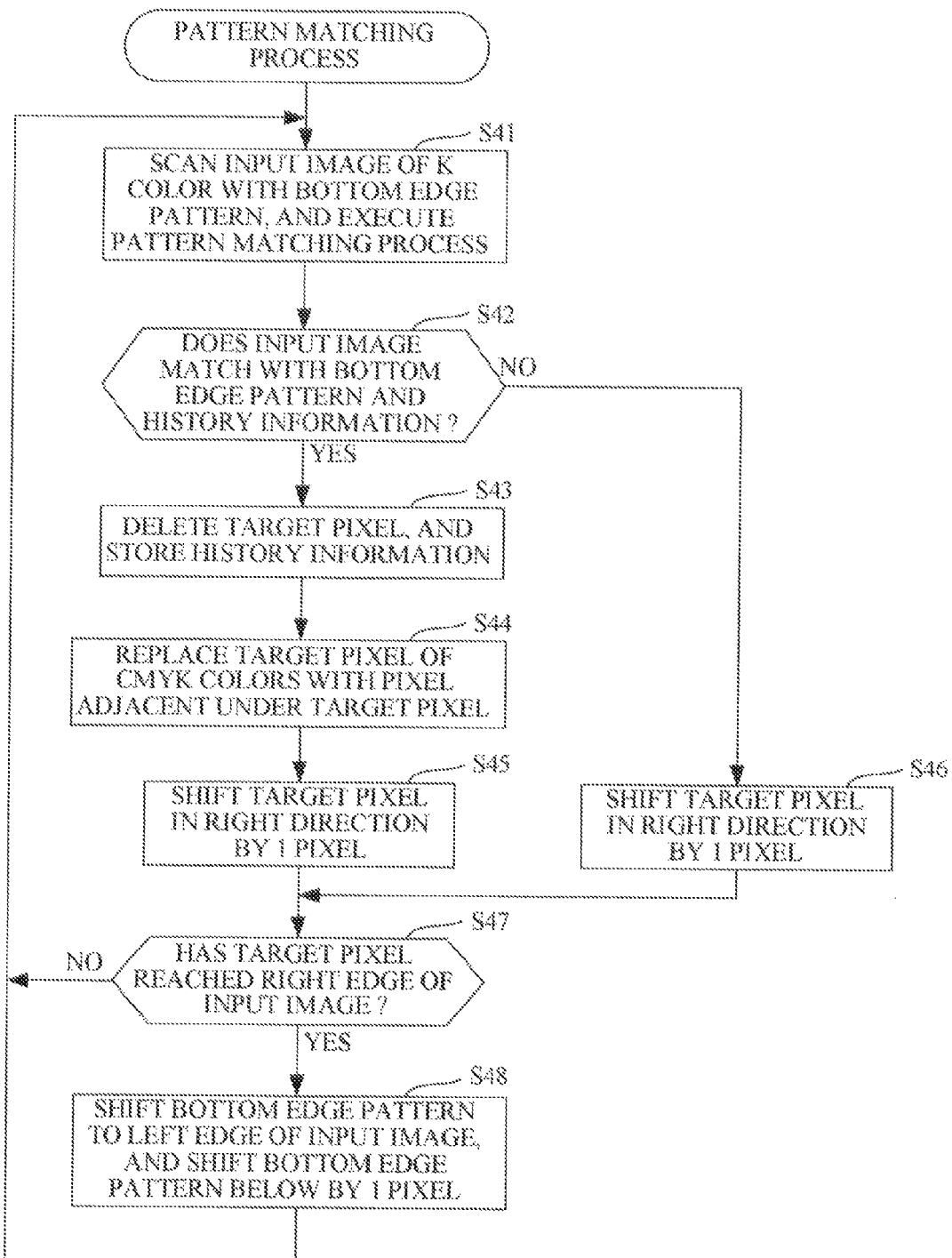
FIG. 9 is a flowchart illustrating the pattern matching process for which the bottom edge pattern is used.

FIG. 9 is a flowchart illustrating the pattern matching process for which the bottom edge pattern is used.

First, the pattern detection unit 16 scans the input image of K color (black) in the input image of CMYK (cyan, magenta, yellow, and black) colors with the bottom edge pattern, and executes the pattern matching process with reference to the history information (step S41). At this time, the pattern detection unit 16 scans all pixels (i.e., pixels from the upper-left corner to the lower-right corner) of the input image of the K color with the bottom edge pattern while shifting the target pixel one by one. When the pattern detection unit 16 judges that the input image of the K color matches with the bottom edge pattern and the history information (YES in step S42), the pixel control unit 17 sets the pixel value of the target pixel of the K color to "0" (i.e., deletes the target pixel), and stores the history information indicating that the target pixel of the K color has been deleted into the history information storage unit 14 (step S43). The pixel replacement processing unit 18 replaces the target pixel of the CMYK colors with a pixel adjacent under the target pixel (step S44). Then, the pattern detection unit 16 shifts the target pixel in the right direction by one pixel (step S45). When the pattern detection unit 16 judges that the input image of the K color does not match to the bottom edge pattern (NO in step S42), the pattern detection unit 16 shifts the target pixel in the right direction by one pixel (step S46).

Moreover, the pattern detection unit 16 judges that the target pixel has reached the right edge of the input image (step S47). If the answer to the step S47 is "YES", the pattern detection unit 16 shifts the bottom edge pattern to the left edge of the input image, and shifts the bottom edge pattern below by one pixel (step S48). The procedure returns to step S41. If the answer to the step S47 is "NO", the procedure returns to step S41.

In the exemplary embodiment, the pattern matching process is executed in order of the left edge pattern, the top edge pattern, the right edge pattern, and the bottom edge pattern. However, an order of using the edge patterns is not limited to this. For example, the pattern matching process may be executed in order of the right edge pattern, the bottom edge pattern, the left edge pattern, and the top edge pattern. In this case, the judgment conditions executed by the pattern detection unit 16 are changed accordingly.

Figure 10A:
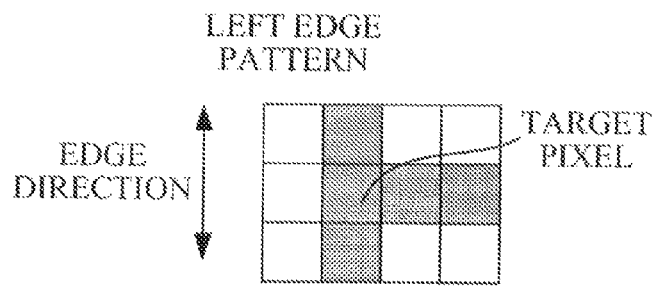
FIG. 10A is a diagram illustrating a first variation example of the left edge pattern of FIG. 5A.
Figure 10B:
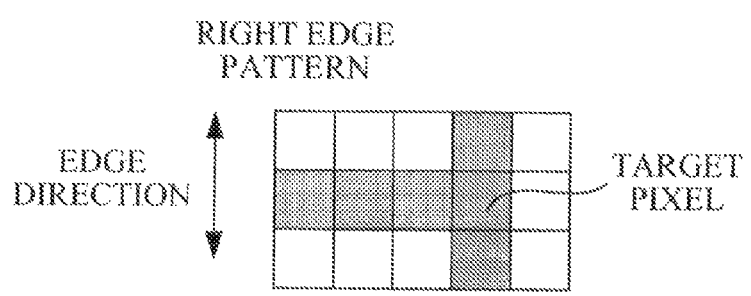
FIG. 10B is a diagram illustrating a first variation example of the right edge pattern of FIG. 5B.
Figure 10C:
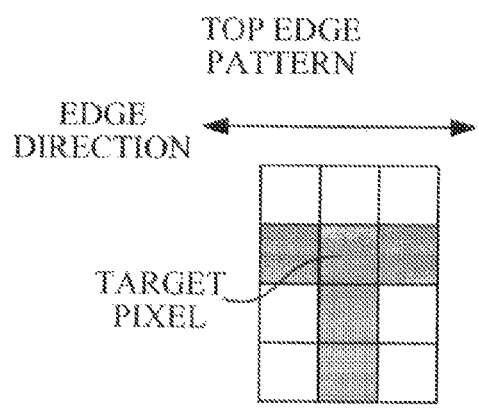
FIG. 10C is a diagram illustrating a first variation example of the top edge pattern of FIG. 5C.
Figure 10D:
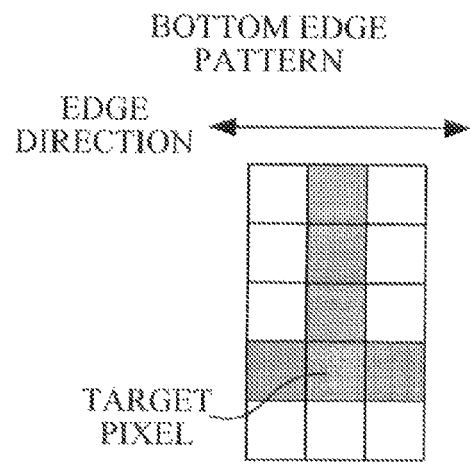
FIG. 10D is a diagram illustrating a first variation example of the bottom edge pattern of FIG. 5D.
Figure 11A:
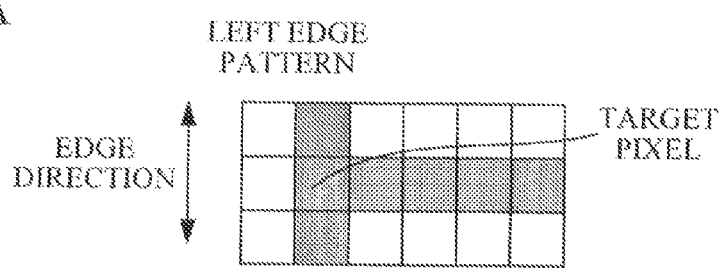
FIG. 11A is a diagram illustrating a second variation example of the left edge pattern of FIG. 5A.
Figure 11B:
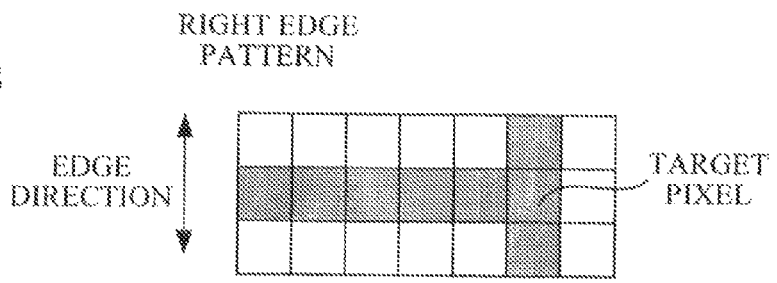
FIG. 11B is a diagram illustrating a second variation example of the right edge pattern of FIG. 5B.
Figure 11C:
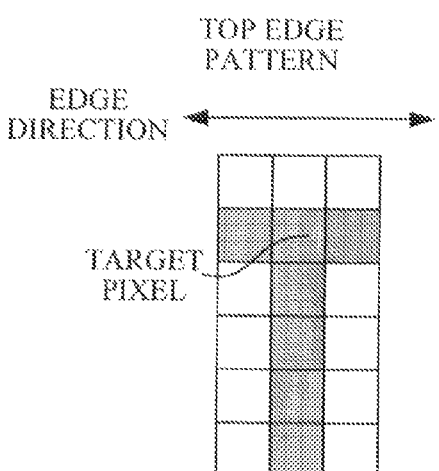
FIG. 11C is a diagram illustrating a second variation example of the top edge pattern of FIG. 5C.
Figure 11D:
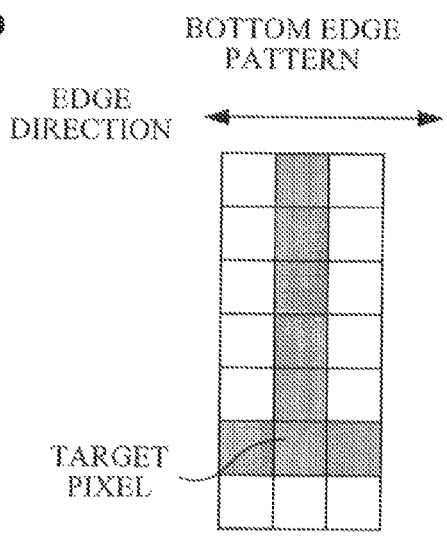
FIG. 11D is a diagram illustrating a second variation example of the bottom edge pattern of FIG. 5D.

FIG. 10A is a diagram illustrating a first variation example of the left edge pattern of FIG. 5A. FIG. 10B is a diagram illustrating a first variation example of the right edge pattern of FIG. 5B. FIG. 10C is a diagram illustrating a first variation example of the top edge pattern of FIG. 5C. FIG. 10D is a diagram illustrating a first variation example of the bottom edge pattern of FIG. 5D. FIG. 11A is a diagram illustrating a second variation example of the left edge pattern of FIG. 5A. FIG. 11B is a diagram illustrating a second variation example of the right edge pattern of FIG. 5B. FIG. 11C is a diagram illustrating a second variation example of the top edge pattern of FIG. 5C. FIG. 11D is a diagram illustrating a second variation example of the bottom edge pattern of FIG. 5D.

In the above-mentioned pattern matching process, the left edge pattern of 3 (row)×5 (column), the right edge pattern of 3 (row)×6 (column), the top edge pattern of 5 (row)×3 (column), and the bottom edge pattern of 6 (row)×3 (column) are used as illustrated in FIGS. 5A to 5D. As illustrated in FIGS. 10A to 10D, the left edge pattern of 3 (row)×4 (column), the right edge pattern of 3 (row)×5 (column), the top edge pattern of 4 (row)×3 (column), and the bottom edge pattern of 5

(row)×3 (column) may be used for the pattern matching process. As illustrated in FIGS. 11A to 11D, the left edge pattern of 3 (row)×6 (column), the right edge pattern of 3 (row)×7 (column), the top edge pattern of 6 (row)×3 (column), and the bottom edge pattern of 7 (row)×3 (column) may be used for the pattern matching process. In this case, the edge patterns illustrated in FIGS. 10A to 10D or FIGS. 11A to 11D are stored into the pattern storage unit 13. Thus, the width of the linear image is adjustable by changing the sizes of the edge patterns.

Figure 12:
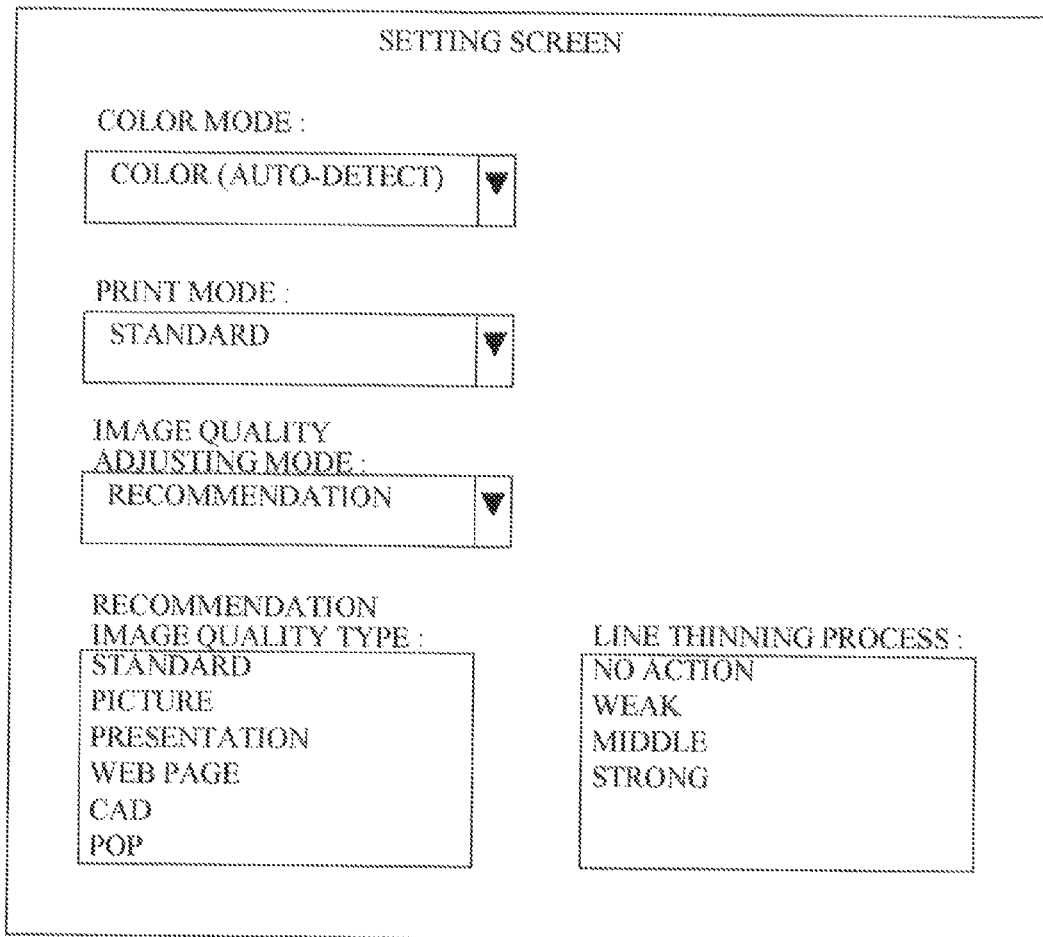
FIG. 12 is a diagram illustrating an example of a setting screen.

The pattern storage unit 13 may store plural sets of the left edge pattern, the right edge pattern, the top edge pattern, and the bottom edge pattern illustrated in FIGS. 5A to 5D, FIGS. 10A to 10D, and FIGS. 11A to 11D. In this case, the UI 25 may display a setting screen as illustrated in FIG. 12, and a user may select any one of sets of the edge patterns from a column of a line thinning process.

The "no action" in the column of the line thinning process indicates that the line thinning process (i.e., the pattern matching process) is not executed. The "weak" in the column of the line thinning process indicates that the line thinning process is executed with the set of the edge patterns of FIGS. 11A to 11D. The "middle" in the column of the line thinning process indicates that the line thinning process is executed with the set of the edge patterns of FIGS. 5A to 5D. The "strong" in the column of the line thinning process indicates that the line thinning process is executed with the set of the edge patterns of FIGS. 10A to 10D.

When the user selects any one of sets of the edge patterns, selection information is notified from the UI 25 to the data readout unit 15. The data readout unit 15 reads out a set of the edge patterns from the pattern storage unit 13 according to the selection information, and transmits the readout set of the edge patterns to the pattern detection unit 16. Then, the above-mentioned pattern matching process is executed.

FIG. 13 is a diagram illustrating a relationship between options in the column of the line thinning process and widths of the linear image. Different line widths can be acquired according to the options in the column of the line thinning process. Therefore, the user acquires the linear image having desired widths by selecting a desired option from the column of the line thinning process.

Figure 14A:
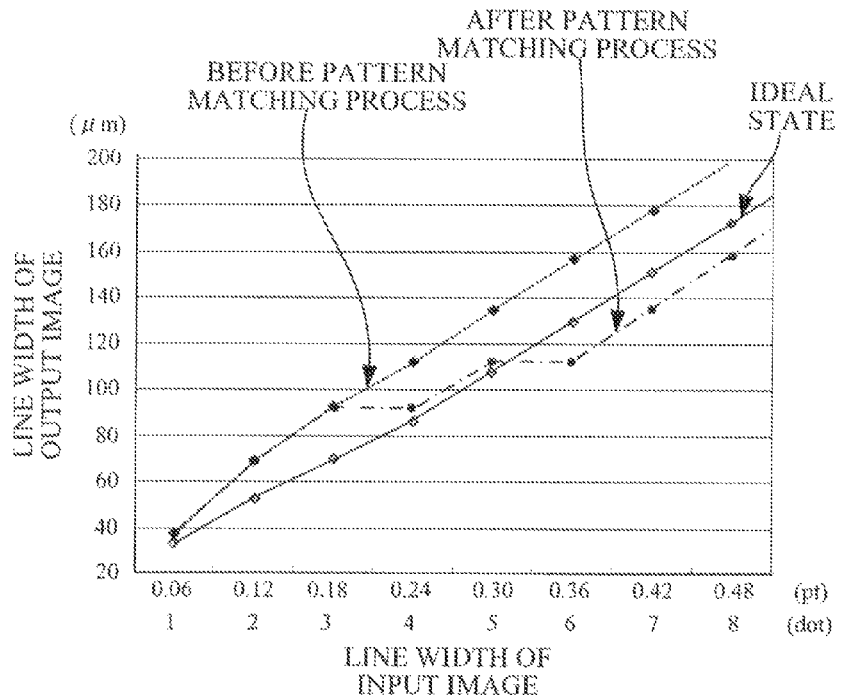
FIG. 14A is a diagram illustrating a relationship between a line width of an input image and a line width of an output image in the positive state.
Figure 14B:
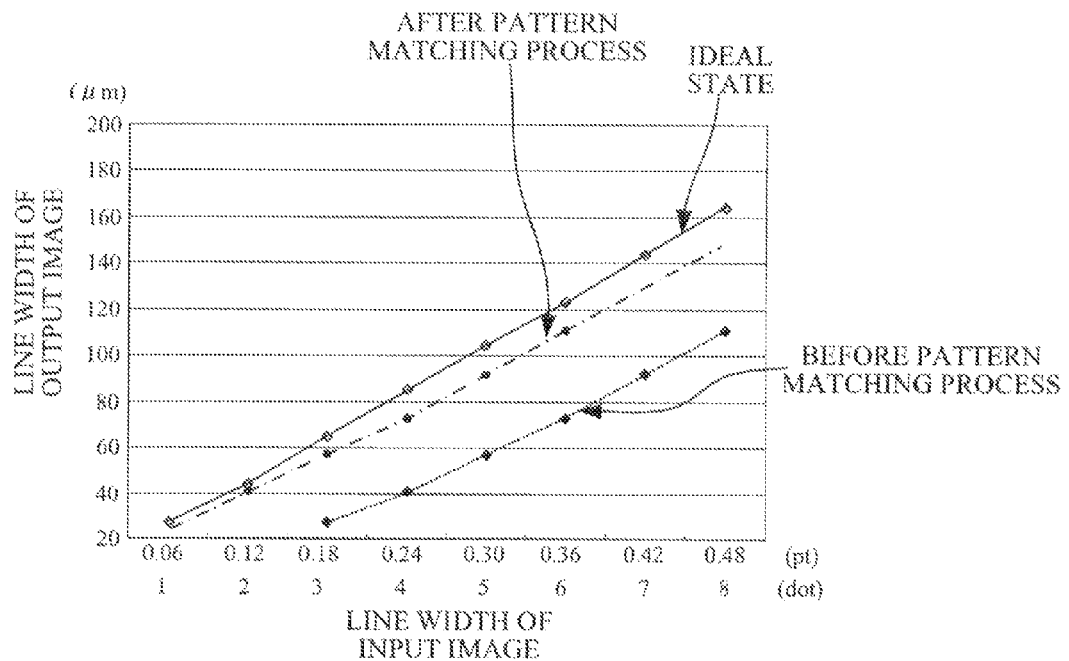
FIG. 14B is a diagram illustrating a relationship between the line width of the input image and the line width of the output image in the negative state.

FIG. 14A is a diagram illustrating a relationship between the line width of the input image and the line width of the output image in the positive state. FIG. 14B is a diagram illustrating a relationship between the line width of the input image and the line width of the output image in the negative state. In FIGS. 14A and 14B, the line width of an ideal state (e.g. an output image of an offset print) and the line widths before and after the pattern matching process are illustrated.

As illustrated in FIG. 14A, the line width of the output image of the positive state before the pattern matching process is about 30 micrometers (μm) thicker than the line width of the ideal state generally. As illustrated in FIG. 14B, the line width of the output image of the negative state before the pattern matching process is about 50 micrometers (μm) thinner than the line width of the ideal state generally. When the line width of the output image of the positive state thins down generally, it becomes easy to cause thin spots in a line equal to or less than 3 dots. Here, the pattern detection unit 16 executes the pattern matching process with the respective edge patterns of FIGS. 5A to 5D, and the pixel control unit 17 deletes the pixel of the input image (i.e., the linear image) by one dot. Since the left and the right edge patterns or the top and the bottom edge patterns of FIGS. 5A to 5D are asymmetry, the deletion amount of pixels is changed according to the width of the linear image.

Therefore, when the line width of the input image is equal to or less than 3 dots as illustrated in FIG. 14A, the line width of the output image of the positive state after the pattern matching process becomes thicker than the line width of the ideal state. When the line width of the input image is 4 or 5 dots, the line width of the output image of the positive state after the pattern matching process becomes about the same as the line width of the ideal state. When the line width of the input image is equal to or more than 6 dots, the line width of the output image of the positive state after the pattern matching process becomes thinner than the line width of the ideal state.

As illustrated in FIG. 14B, the line width of the output image of the negative state after the pattern matching process becomes 2 dots thicker than the line width of the output image of the negative state before the pattern matching process generally.

FIG. 15A illustrates an example of the Chinese characters which are formed by a Ming type of 4 points in the positive and the negative states before the pattern matching process. FIG. 15B illustrates an example of the Chinese characters which are formed by the Ming type of 4 points in the positive and the negative states after the pattern matching process. FIG. 15C illustrates an example of the Chinese characters which are formed by a Gothic type of 4 points in the positive and the negative states before the pattern matching process. FIG. 15D illustrates an example of the Chinese characters which are formed by the Gothic type of 4 points in the positive and the negative states after the pattern matching process.

The line width of each of the Chinese characters which are formed by the Ming type and the Gothic type in the positive state becomes thin by the pattern matching process. The collapse of the Chinese characters which are formed by the Ming type and the Gothic type in the negative state is reduced by the pattern matching process.

As described above, according to the exemplary embodiment, the image processing apparatus 1 includes: the pattern storage unit 13 that stores the top edge pattern, the bottom edge pattern, the left edge pattern, the right edge pattern which are matched to the top, the bottom, the left, and the right edge portions of the linear image included in the input image, respectively; the pattern detection unit 16 that detects whether the linear image included in the input image matches at least one edge pattern stored into the pattern storage unit 13; and the pixel control unit 17 that, when it is detected that the linear image included in the input image matches with at least one edge pattern stored into the pattern storage unit 13, deletes the pixel of the linear image corresponding to the target pixel included in the matched edge pattern. Then, each of the edge patterns sets the target pixel to the intersection point, and includes the crisscross pattern composed of the target pixel, the plural reference pixels extending from the target pixel in the edge direction in parallel to the edge row of the input image to be deleted, and the plural reference pixels extending from the target pixel in the direction perpendicular to the edge direction. Further, the crisscross pattern included in the top edge pattern and the crisscross pattern included in the bottom edge pattern are asymmetry, and the crisscross pattern included in the left edge pattern and the crisscross pattern included in the bottom edge pattern are asymmetry. It is therefore evaded that the width of the linear image is deleted more than necessary. Further, the linear image included in the input image can be set to the most suitable state according to the line width. The most suitable state is a state where the thin spots do not occur to the linear image of the character, the drawing, or the like, and the collapse of the linear image does not occur. Also, when the width of the linear image is too thick, it is possible to thin the width of the linear image.

When the input image is the reversed image in which the portion of the reversed image having meaning is composed of the non-print pixel and the portion of the reversed image having no meaning is composed of the print pixel, the pattern detection unit 16 detects whether the print pixel included in the reversed image matches with at least one edge pattern stored into the pattern storage unit 13. When the pattern detection unit 16 detects that the print pixel included in the reversed image matches with at least one edge pattern stored into the pattern storage unit 13, the pixel control unit 17 deletes the print pixel that corresponds to the target pixel included in the matched edge pattern, and is included in the reversed image. Therefore, the width of the non-print pixels in the reversed image increases, and hence the collapse of the reversed image can be improved.

A non-transitory computer readable recording medium on which the software program for realizing the functions of the image processing apparatus 1 is recorded may be supplied to the image processing apparatus 1, and the CPU 21 of the image processing apparatus 1 may read and execute the program recorded on the non-transitory computer readable recording medium. In this manner, the same effects as those of the above-described exemplary embodiment can be achieved. The non-transitory computer readable recording medium for providing the program may be a CD-ROM, a DVD, or a SD card, for example.

Alternatively, the image processing apparatus 1 may execute a software program for realizing the functions of the image processing apparatus 1, so as to achieve the same effects as those of the above-described exemplary embodiment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
a first storage portion that stores a plurality of patterns used for matching with edge portions of a linear image included in an input image, the patterns having respective different sizes, and each of the patterns being composed of a plurality of pixels and including a target pixel corresponding to a pixel to be deleted in the linear image;
a selection portion that selects a pattern having a size according to a line width of a line thinning process to the linear image, from the patterns stored into the first storage portion;
a pattern detection portion that matches the selected pattern with the linear image while shifting the selected pattern, and detects whether the selected pattern is matched with the linear image; and
a deletion portion that, when it is detected that the selected pattern is matched with the linear image, deletes the pixel in the linear image corresponding to the target pixel in the selected pattern.

2. The image processing apparatus according to claim 1, further comprising:
a second storage portion that stores a position of a pixel which has been deleted by the deletion portion as history information,
wherein when the pattern detection portion detects whether the selected pattern is matched with the linear image, the pattern detection portion judges whether the history information meets given conditions.

3. The image processing apparatus according to claim 1, further comprising:
a replacement portion that replaces the pixel to be deleted by the deletion portion with a pixel of a background image which is adjacent to the target pixel and is other than the linear image included in the input image.

4. The image processing apparatus according to claim 1, wherein:
the first storage portion stores a plurality of sets of a top edge pattern, a bottom edge pattern, a left edge pattern, and a right edge pattern that match with up, down, left and right edge portions of the linear image included in the input image respectively, the shapes of the corresponding edge patterns included the respective sets being different from each other, and
the image processing apparatus further comprises a setting portion that sets a set to be used by the pattern detection portion from the plurality of sets.

5. The image processing apparatus according to claim 1, wherein when the input image is a reversed image in which a portion of the reversed image having meaning is composed of a non-print pixel and a portion of the reversed image having no meaning is composed of a print pixel, the pattern detection portion detects whether the print pixel included in the reversed image matches with at least one of the patterns stored into the first storage portion, and
when it is detected that the print pixel included in the reversed image matches with at least one of the patterns stored into the first storage portion, the deletion portion deletes the print pixel that corresponds to the target pixel included in the matched pattern, and is included in the reversed image.

6. A non-transitory computer readable recording medium causing a computer to execute a process, the process comprising:
storing a plurality of patterns used for matching with edge portions of a linear image included in an input image, the patterns having respective different sizes, and each of the patterns being composed of a plurality of pixels and including a target pixel corresponding to a pixel to be deleted in the linear image;
selecting a pattern having a size according to a line width of a line thinning process to the linear image, from the stored patterns;
matching the selected pattern with the linear image while shifting the selected pattern, and detecting whether the selected pattern is matched with the linear image; and
deleting the pixel in the linear image corresponding to the target pixel in the selected pattern when it is detected that the selected pattern is matched with the linear image.

* * * * *